US009755961B2

(12) United States Patent
Kruglick

(10) Patent No.: US 9,755,961 B2
(45) Date of Patent: *Sep. 5, 2017

(54) PROTECTION AGAINST RULE MAP UPDATE ATTACKS

(71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/934,774

(22) Filed: Nov. 6, 2015

(65) Prior Publication Data
US 2016/0065452 A1   Mar. 3, 2016

Related U.S. Application Data

(63) Continuation of application No. 14/455,312, filed on Aug. 8, 2014, now Pat. No. 9,231,916.

(51) Int. Cl.
| G06F 15/16 | (2006.01) |
| H04L 12/725 | (2013.01) |
| H04L 29/06 | (2006.01) |
| H04L 12/701 | (2013.01) |
| H04L 12/24 | (2006.01) |
| H04L 12/26 | (2006.01) |

(52) U.S. Cl.
CPC .......... *H04L 45/30* (2013.01); *H04L 41/5029* (2013.01); *H04L 43/0876* (2013.01); *H04L 45/00* (2013.01); *H04L 45/302* (2013.01); *H04L 63/0263* (2013.01); *H04L 63/1441* (2013.01)

(58) Field of Classification Search
CPC ....................................................... H04L 45/30
USPC .......................................................... 726/14
See application file for complete search history.

(56) References Cited

U.S. PATENT DOCUMENTS

| 7,823,202 B1 * | 10/2010 | Nucci | ..................... H04L 45/00 709/224 |
| 8,141,156 B1 * | 3/2012 | Mao | ..................... H04L 45/021 709/223 |
| 8,352,391 B1 | 1/2013 | Kapadia | |

OTHER PUBLICATIONS

"Denial-of-Service (DoS) Secured Virtual Tenant Networks (VTN)," Radware and NEC, Radware Ltd, pp. 1-11 (2012).

(Continued)

*Primary Examiner* — Peter Shaw
(74) *Attorney, Agent, or Firm* — Brundidge & Stanger, P.C.

(57) ABSTRACT

Technologies are described herein to manage the replacement of routing rules. Some example technologies may receive a request to replace one or more active rules in a routing device with one or more stored rules. Each of the active rules and the stored rules may specify a routing rule that specifies how to route packets within a network. The active rules may be routing rules that are actively being used by the routing device. The stored rules may be routing rules that are not currently in use by the routing device. A determination may be made as to whether a number of active rule replacements for the routing device exceeds a threshold. In response to determining that the number of the active rule replacements exceeds the threshold, the request to replace the one or more active rules in the routing device may be denied.

16 Claims, 5 Drawing Sheets

(56) References Cited

OTHER PUBLICATIONS

"Network processor," Wikipedia, Accessed at http://web.archive.org/web/20130603200923/http://en.wikipedia.org/wiki/Network_processor, last modified date Feb. 28, 2013, pp. 1-3.
Bort, J., "Oracle Just Declared War on Cisco," Accessed at http://web.archive.org/web/20140118084358/http://www.businessinsider.com/oracle-cisco-software-defined-networking-2012-7, Jul. 30, 2012, pp. 1-10.
Jackson, J., "VMware to Acquire Openflow Pioneer Nicira for $1.26 Billion," accessed at http://www.cio.com/article/2393876/mergers-acquisitions/vmware-to-acquire-openflow-pioneer-nicira-for--1-26-billion.html, Jul. 23, 2012, pp. 1-3.
Katta, N., et al., "Infinite CacheFlow in Software-Defined Networks," Princeton University, pp. 1-7 (Sep. 2013).
Kerner, S. M., "VMware Takes Aim at Software Defined Networking and OpenFlow," accessed at http://www.internetnews.com/infra/vmware-takes-aim-at-software-defined-networking-and-openflow.html, May 14, 2012, pp. 1-2.
Kessler, R. E., "The Cavium 32 Core OCTEON II 68xx," Cavium Hot Chips 23, pp. 1-33 (Aug. 2011).
Levy, S., "Going With the Flow: Google's Secret Switch to the Next Wave of Networking," accessed at http://web.archive.org/web/20140730133543/http://www.wired.com/2012/04/going-with-the-flow-google, Apr. 17, 2012, pp. 1-12.
McKeown, N., et al., "OpenFlow: Enabling Innovation in Campus Networks," ACM SIGCOMM Computer Communication Review, vol. 38, Issue. 2, pp. 69-74 (Apr. 2008).
Mrkalj, M., "Verizon to Demonstrate Software Defined Networking Principles With Collaborative Lab Trials," accessed at http://web.archive.org/web/20131102080120/http://bizcloudnetwork.com/verizon-openflow, Apr. 17, 2012, pp. 1-3.
Reitblatt, M., et al., "Consistent Updates for Software-Defined Networks: Change You Can Believe In!," Hotnets-X Proceedings of the 10th ACM Workshop on Hot Topics in Networks, Article No. 7, pp. 1-6 (2011).
Ristenpart, T., et al., "Hey, You, Get Off of My Cloud: Exploring Information Leakage in Third-party Compute Clouds," In Proceedings of the 16th ACM Conference on Computer and Communications Security, pp. 199-212 (2009).
Sezer, S., et al., "Are we ready for SDN?—Implementation Challenges for Software-Defined Networks," Communications Magazine, IEEE, vol. 51, Issue 7, pp. 36-43 (1-13) (Jul. 2013).
Shackleford, D., "SDN security strategies for network attack prevention," Techtarget Search SDN, Jun. 28, 2013, pp. 1-3.
Shieh, A., et al., "Sharing the Data Center Network," In Proceedings of the 8th USENIX Conference on Networked Systems Design and Implementation, pp. 309-322 (2011).
Shin, S., et al., "FRESCO: Modular Composable Security Services for Software-Defined Networks," ISOC Network and Distributed System Security Symposium, pp. 1-16 (Feb. 2013).
Tootoonchian, A., and Ganjali, Y., "HyperFlow: A Distributed Control Plane for OpenFlow," In Proceedings of the 2010 Internet Network Management Conference on Research on Enterprise Networking, USENIX Association, pp. 1-6 (2010).

\* cited by examiner

PROTECTION AGAINST RULE MAP UPDATE ATTACKS

CROSS-REFERENCE TO RELATED APPLICATION

This application is a Continuation application under 35 U.S.C. §120 of U.S. patent application Ser. No. 14/455,312, filed on Aug. 8, 2014, now U.S. Pat. No. 9,231,916, the entire disclosure of which is incorporated herein by reference.

BACKGROUND

Unless otherwise indicated herein, the materials described in this section are not prior art to the claims in this application and are not admitted to be prior art by inclusion in this section.

Software Defined Networking (SDN) is an ongoing infrastructure trend in which the control layer of networks is abstracted away from the switching layer. SDN uses a multi-layer approach that includes a switching layer. The switching layer may include simple commodity switches that contain network ports, network processors to process packets and extract their properties, and a set of rules. The rules instruct the switch how to handle incoming packets that are received. Switches, however, have limited space to hold rules. As such, in some cases, one or more active rules in the switch are periodically replaced with stored rules to process incoming packets.

Changing a rule might consist of reprogramming the switch. Generally, incoming packets that do not match one of the active rules in the switch are forwarded to a controller that attempts to locate a matching rule in a set of stored rules. If a matching rule is located, the controller removes one of the active rules from the switch and installs the matching rule in the switch.

In some cases, a race condition might exist when the switch is not able to process a matching rule in time. In these cases, the switch might drop a packet, forward the packet to a wrong destination, or broadcast the packet in an effort to find the right destination. Broadcasting a packet, when rarely performed (e.g., new packets starting a new session), generally causes few problems. In a "rule map attack", however, an attacker can force repeated broadcasting or loss of a target stream of packets, thus potentially obtaining copies of target data or breaking a connection.

SUMMARY

The present disclosure generally describes techniques to manage the replacement of routing rules in a routing device. Some example methods may include receiving a request to replace one or more active rules in a routing device with one or more stored rules. Each of the active rules and the stored rules may specify a routing rule that specifies how to route packets within a network. The active rules may be routing rules that are actively being used by the routing device. The stored rules may be routing rules that are not currently in use by the routing device. A determination may be made as to whether a number of active rule replacements for the routing device exceeds a threshold. In response to determining that the number of the active rule replacements exceeds the threshold, the request to replace the one or more active rules in the routing device may be denied.

In another example, a system is described. The system may include a routing device that is coupled to a controller. The routing device may be configured to route packets within a network based at least in part on active rules stored within a memory of the routing device. The controller may be configured to receive a request to replace an active rule in the routing device with a stored rule. The controller may also be configured to deny the request to replace the active rule in the routing device with the stored rule based at least in part on a determination that a number of rule replacements made by the routing device within a specified period of time exceeds a threshold.

In a further example, a computer-readable storage medium is described. The computer-readable storage medium comprises computer-executable instructions stored thereon which, in response to execution by a computer, cause the computer to determine a number of active rule replacements for a routing device within a rolling time window. The computer-executable instructions might also be used to deny a request to replace one or more of the active rules stored within the memory of the routing device in response to a determination that the number of the active rule replacements within the rolling time window exceeds a threshold.

The foregoing Summary is illustrative only and is not intended to be in any way limiting. In addition to the illustrative aspects, embodiments, and features described above, further aspects, embodiments, and features will become apparent by reference to the Figures and the following Detailed Description.

BRIEF DESCRIPTION OF THE FIGURES

The foregoing and other features of this disclosure will become more fully apparent from the following Detailed Description, accompanying Figures, and appended claims. Understanding that these Figures depict only several embodiments in accordance with the disclosure and are, therefore, not to be considered limiting of its scope, the disclosure will be described with additional specificity and detail with reference to the accompanying Figures, in which:

DETAILED DESCRIPTION

Figure 1:
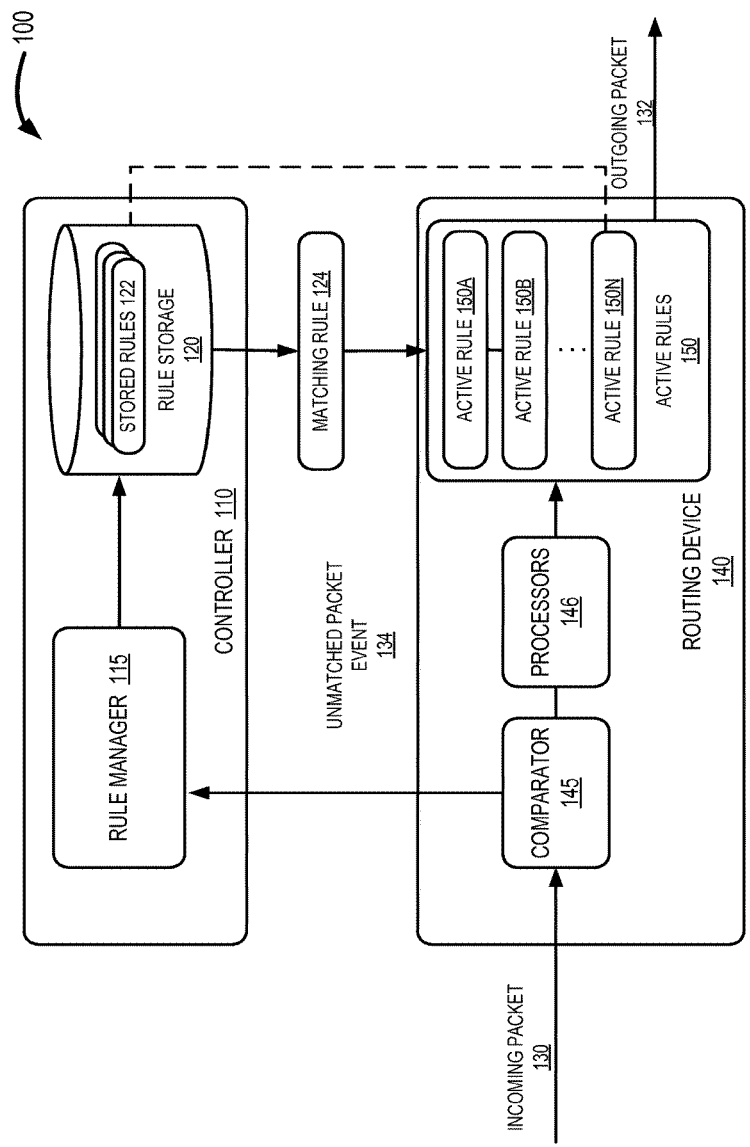
FIG. 1 is a functional block diagram illustrating an example Software Defined Networking (SDN) architecture that includes a rule manager.

In the present Detailed Description, reference is made to the accompanying Figures, which form a part hereof. In the Figures, similar symbols typically identify similar components, unless context dictates otherwise. The illustrative embodiments described in the Detailed Description and Figures are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to technologies adapted to manage replacement of rules within a routing device. The routing device might be a network switch, a router, or some other type of computing device or network appliance that might be used to route (e.g., direct) packets within a network. The routing device might comprise processors configured to perform packet inspection using active rules that are stored in a memory of the routing device. In some examples, a separate processor/thread might be associated with each of the active rules currently in use by the routing device.

The routing device may be configured to determine how to direct incoming traffic (e.g., packets) based on rules. In some cases, an active rule may be used to direct the incoming traffic. For example, the routing device might determine that one of the active rules currently in use by the routing device matches the incoming packet. In other cases, the incoming packet may not match any of the active rules currently in use by the routing device.

As briefly discussed above, incoming packets that do not match one of the active rules in use by the routing device may be forwarded to a controller that may attempt to locate a matching rule that is not in current use by the routing device. For example, the controller might locate a matching rule within a rule storage that may be used to direct the packet. If a matching rule is located, the controller might generate a rule change command that if performed is configured to replace one of the active rules within the routing device with the matching rule obtained from stored rules.

In some cases, as also briefly discussed above, a race condition might exist when the routing device is not be able to process a matching rule in time to handle the routing of an incoming packet. In these cases, a routing device might be configured to drop a packet, forward the packet to a wrong destination, or broadcast the packet in an effort to find the right destination. For example, a rule map attack might be initiated in an attempt to observe incoming traffic (e.g., passwords, payment methods or other data). Instead of automatically performing the rule change command that may lead to the routing device to broadcast packets, the controller may be configured to manage the replacement of the active rules in the routing device.

In some cases, the controller may be configured to confirm, deny, or delay rule change commands. For instance, the controller may confirm, deny, or delay rule change commands based at least in part on the number of rule change commands received within a predetermined period of time or the number of rule replacements made within the routing device. In some examples, the controller might be configured to maintain rolling time counters to count the number of rule changes made (or requested rule changes) in a routing device. One or more counters might be utilized. For example, a counter might be associated with each different user. In other examples, a counter might be associated with untrusted users. The controller may be configured to maintain a counter for all or a portion of the different routing devices used within an operating environment. The counter may reside within the routing device or controller.

The count might be used by the controller to deny or delay the rule change command. For example, a rule change command might be denied when a user has requested to make more than a specified number of rule changes within a specified time (e.g., within 100 ms). The specified number of rule changes and specified time might be different for different routing devices. For example, the number of rule changes and specified time might be based on the specific characteristics of the routing device (e.g., number of processors, memory).

The controller might also determine what active rules to replace on the routing device based on Quality of Service (QoS) purchase data. For example, some customers may be able to replace more of the active rules based on purchasing a higher level of service as compared to other customers. More details relating to managing the replacement of rules within a routing device are provided below.

FIG. 1 is a functional block diagram illustrating an example Software Defined Networking (SDN) architecture 100 that includes a rule manager, arranged in accordance with at least some embodiments presented herein. As illustrated, the SDN architecture 100 may include a routing device 140 communicatively coupled to a controller 110. The routing device 140 may include a comparator 145, processors 146 and active rules 150. The controller 110 may include a rule manager 115 and a rule storage 120.

In operation, the routing device 140 may receive incoming traffic (e.g., an incoming packet 130) and direct the traffic based on a routing rule that might be currently in use by the routing device 140 (e.g., the active rules 150). The routing device 140 might also obtain one or more of stored rules 122 that are stored in the rule storage 120 to direct the incoming packet 130.

The routing device 140 might be any type of computing device or network apparatus that is configured to direct packets within a network. For example, the routing device 140 may be a network switch that operates at layer 2 (i.e., the data link layer) or may perform all or a portion of the functionality of a routing device that operates at layer 3 (i.e., the network layer). In some examples, the routing device 140 may include one or more network switches.

The routing device 140 might include one or more processors 146. In some examples, the routing device 140 includes a processor (e.g., one of the processors 146) for each (or approximately each) of the active rules 150. For instance, each of the different active rules 150A-150N might be associated with a processor designed for packet inspection. In some examples, the routing device 140 might include general purpose processing cores and HFA (hardware finite automata) engines, such as the multi-core MIPS64 processors in the OCTEON II Internet Application Processor Family that are available from Cavium, Inc. Generally, HFA engines are designed to be power efficient and are hardware accelerated for finite automata computing which may be used for network processing.

Each HFA might be programmed for (approximately) one rule at a time (e.g., an HFA having 48 engines could hold approximately 48 active rules). The number of active rules might not be exactly the number of HFA since usually a set of rules might be reduced by removing or combining redundant rules in various ways. Some example finite state automata are available and used in network processors from companies that include Acme Packet (APKT), Cisco Systems (CSCO), GENBAND Inc., Telefonaktiebolaget LM Ericsson, Huawei Technologies Co., Ltd., Nicira, Xsigo, and Sonus Networks Inc.

As illustrated, the routing device 140 might include the comparator 145 that may be configured to receive the incoming packet 130 and dispatch the incoming packet 130 for matching against one of the active rules 150. In some examples, the incoming packet 130 may be processed in parallel by the processors 146 that are programmed with an active rule (e.g., one of the active rules 150). For example, as discussed above, a processor (e.g., one of the processors 146) might be associated with each of the active rules 150A-150N. As discussed above, different routing devices 140 may have a different capacity for storing the active rules 150.

The rule storage 120 may be configured to store rules (e.g., the stored rules 122) from one or more users. For example, a user may upload a small or large number of different rules to the rules storage 120. The rules may be uploaded to the rules storage 120 at one time or at different times.

An unmatched packet event 134 may be generated in response to the incoming packet 130 not matching any of the active rules 150 currently in use by the routing device 140. The unmatched packet event 134 might include various information, such as the incoming packet 130 and other information that is associated with the incoming packet 130 (e.g., time of arrival, destination, and origination).

In response to the controller 110 receiving an unmatched packet event 134, the rule manager 115 may be configured to locate one of the stored rules 122 for processing the incoming packet 130. In response to locating a matching rule 124 from the stored rules 122 located in the rule storage 120, the controller 110 may be configured to generate a rule change command that when performed replaces one of the active rules 150 with the matching rule 124.

Different mechanisms might be used to replace one of the active rules 150 with the matching rule 124. For example, a least recently used (LRU) mechanism, or some other mechanism based on LRU or some other replacement mechanism, might be used to replace one or more of the active rules 150. After inserting the matching rule 124 into the active rules 150, the routing device 140 may use the matching rule 124 to direct the incoming packet 130 to a destination as indicated by an outgoing packet 132.

Instead of automatically replacing one or more of the active rules 150 whenever the unmatched packet event 134 occurs and a rule change command is generated by the controller 110, the controller 110 may be configured to limit the number of rule replacements (e.g., using a threshold). In some examples, the controller 110 and/or the rule manager 115 may be configured to limit the turnover of the active rules 150 currently in use by the routing device 140. For instance, the turnover rate for the active rules 150 might be set to a specified turnover rate.

The specified turnover rate might be different for each routing device 140 as well as for each user that is using the routing device 140 to process incoming packets, such as the incoming packet 130. For example, the specified turnover rate might be set to a lower turnover rate for a user that is not trusted and to a higher turnover rate for a user that is trusted. In other words, the controller 110 may be configured to allow users to access as much of the active rule space as is necessary for efficiency, but limits the turnover rate of the active rules 150. In this way, a single user may not force a full rule turnover in the active rules 150 within a specified time period. In other examples, the turnover rate might use a detected performance of the routing device 140.

Figure 2:
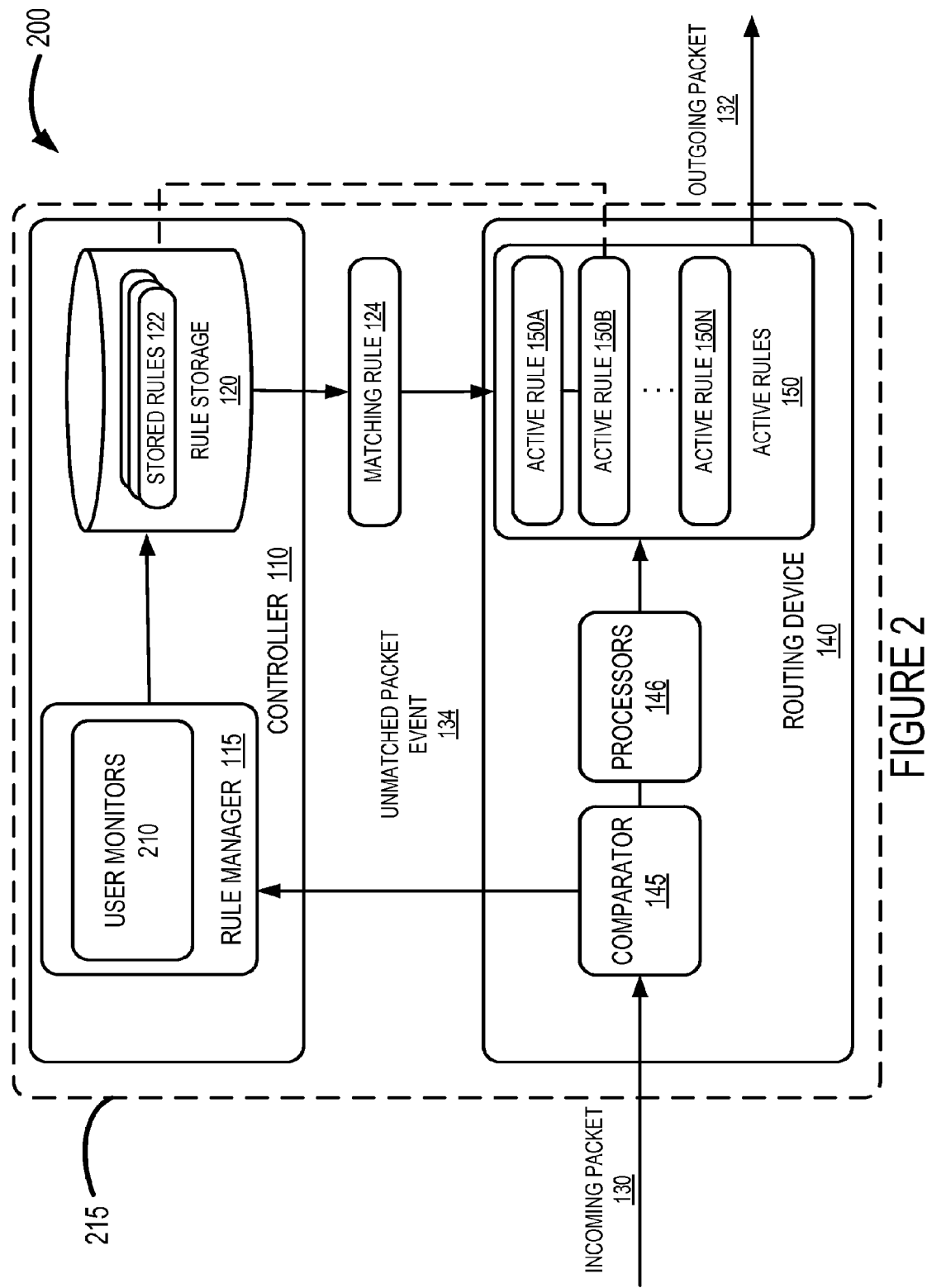
FIG. 2 is a functional block diagram illustrating an example Software Defined Networking (SDN) architecture that includes user monitors.

FIG. 2 is a functional block diagram illustrating an example Software Defined Networking (SDN) architecture 200 that includes user monitors 210, arranged in accordance with at least some embodiments presented herein. The SDN architecture 200 is similar to the SDN architecture 100 that is illustrated in FIG. 1 but includes the user monitors 210. While the controller 110 is shown separately from the routing device 140, the controller 110 may be included within a same hardware as the routing device 140 as illustrated by the dashed line 215. Generally, in some embodiments, the routing device 140 is architecturally separate from the controller 110.

In operation, the user monitors 210 are monitoring devices that may be configured to monitor rule changes for one or more users. In some examples, the user monitors 210 are configured to determine when the incoming packet 130 that is associated with a particular user triggers a rule change command. For example, the user monitors 210 may be configured to maintain a count of rule changes that have resulted in the matching rule 124 replacing one of the active rules 150 within the rule storage 120.

In some examples, a user monitor (e.g., one of the user monitors 210) may be configured for each different user. In other examples, a user monitor (e.g., one of the user monitors 210) may be configured for entrusted users. For example, some users may be determined to be trusted and not subject to the limitation of rule changes.

Figure 3:
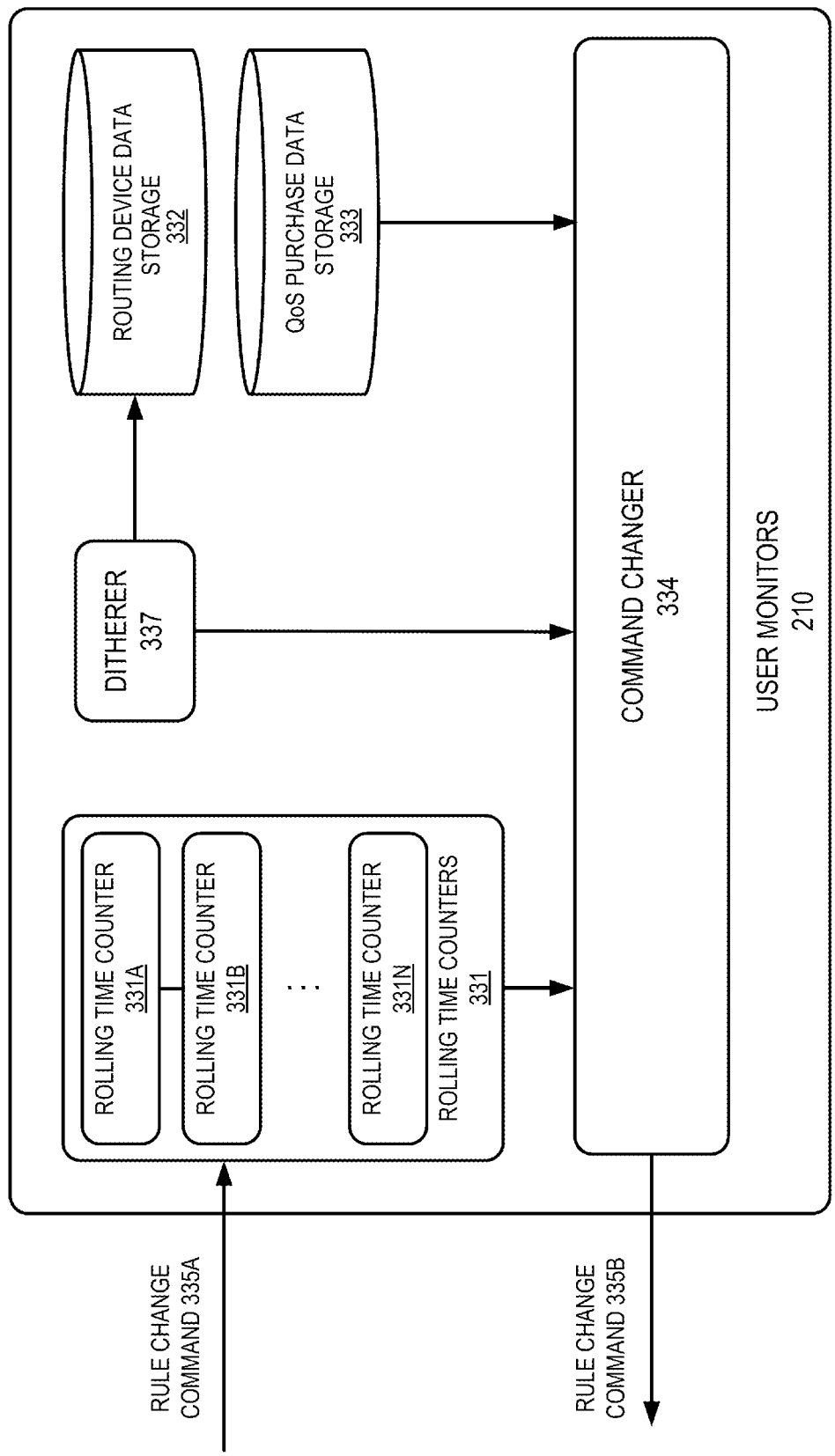
FIG. 3 is a functional block diagram illustrating the user monitors.

The user monitors 210 may be configured to delay or deny a rule change command when a particular user or users has exceeded a number of actual rule changes or requested rule changes within a specified period of time. FIG. 3 provides more details regarding operation and configuration of the user monitors 210.

FIG. 3 is a functional block diagram illustrating the user monitors 210, in accordance with at least some embodiments described herein. As illustrated the user monitors 210 comprise rolling time counters 331, a routing device data storage 332, a QoS purchase data storage 333, a ditherer 337 and a command changer 334. The rolling time counters 331 may include one or more rolling time counters 331A-331N.

The command changer 334 may be coupled to the rolling time counters 331, the ditherer 337 and the QoS purchase data storage 333. The routing device data storage 332 may be coupled to the ditherer 337.

During operation, the series of per-switch rolling time counters 331 may be configured to count the number of rule change commands, such as a rule change command 335A, within a specified time window (e.g., within the last 100 milliseconds). In some examples, the specified time window is based on a time to replace the active rules 150 with the stored rules 122. For example, each different type of routing device 140 might be associated with a different time window. In other examples, the rolling time counters 331 may be configured to count the actual number of rule replacements that have been made to the active rules 150 within the specified time window. A duration of the time window might be changed by the controller 110 based on a detected performance of the routing device 140. For example, in some cases, the time window might be adjusted upward and in other cases, the time window might be adjusted downward. In other examples, the specified time window may be related to network conditions. For example, the time window might be adjusted in response to a change in an amount or type of network traffic.

A routing device data storage 332 may be configured to store data relating to routing device data. For example, the routing device data storage 332 may be configured to store how many active rules 150 may be stored by an associated routing device 140, the replacement rate for the routing device 140, and the like.

In some examples, the ditherer 337 may be used to slightly change the specified time window for one or more routing devices 140. For instance, the dithering module 337 may slightly change the specified time windows on a pseudorandom basis. Dithering the specified time window might assist to prevent predictability in race generation for a particular routing device, such as the routing device 140, such that an attacker loses targeting resolution up to the timeframe of seconds and cannot reasonably guarantee race conditions.

A QoS purchase data storage 333 stores data relating to service levels for users of the routing device 140. As discussed above, different users (e.g., customers) might pay for different levels of service by a datacenter. For example, the datacenter (not shown) might sell different maximum update rates per switch on a planned basis. The information from 331, 337, and 333 are fed into the command changer 334 that may be configured to form a ratio or other comparison between the rolling time counters 331 and the capacity of the routing device 140 to confirm, deny, or delay rule change commands. Finally, a modified rule change command 335B may be issued.

Figure 4:
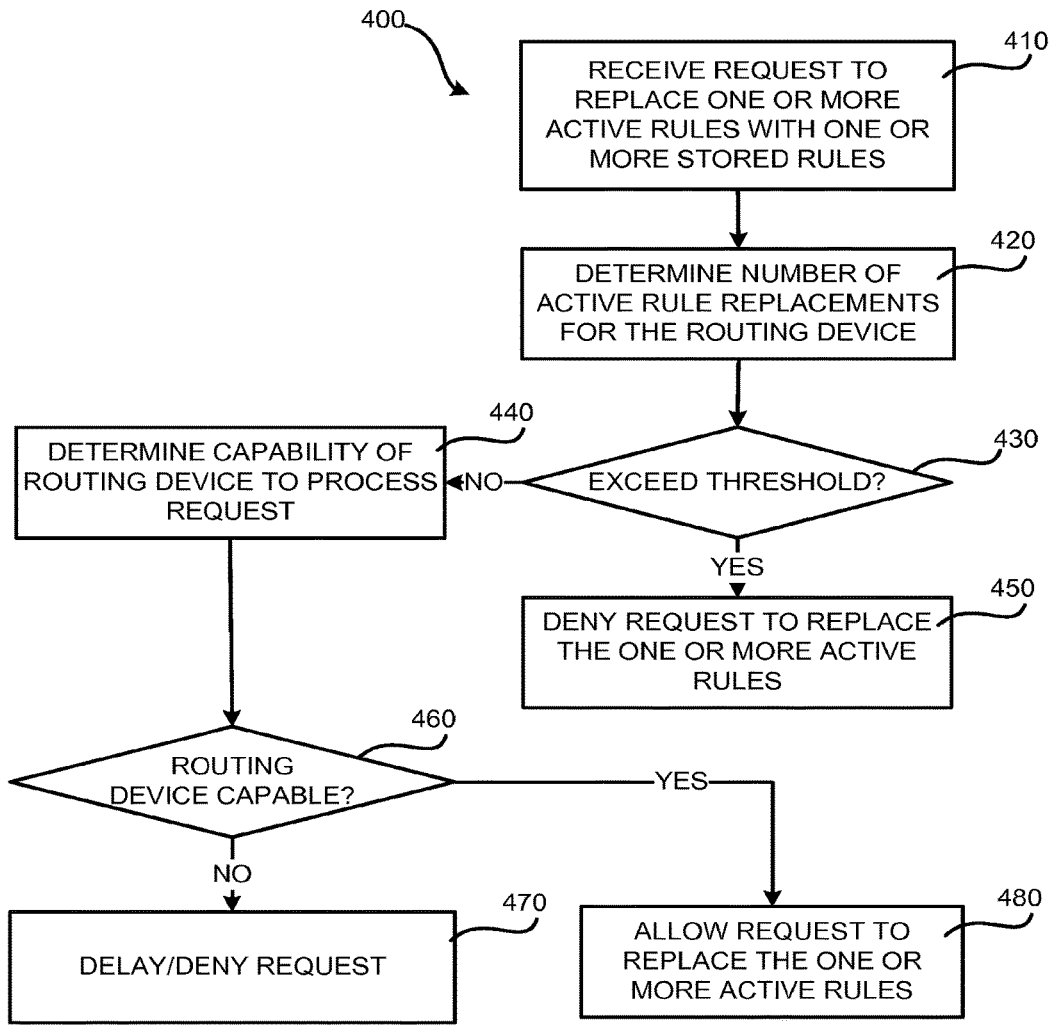
FIG. 4 is a flow diagram illustrating an example process adapted to manage replacement of routing rules in a routing device.

FIG. 4 is a flow diagram illustrating an example process 400 adapted to manage replacement of routing rules in a routing device, in accordance with at least some embodiments presented herein. The process 400 may begin at operation 410 ("RECEIVE REQUEST TO REPLACE ONE OR MORE ACTIVE RULES WITH ONE OR MORE STORED RULES"), where a request is received to replace one or more active rules in the routing device 140 with one or more stored rules 122. As described above, the routing device 140 has a limited amount of memory space to store the active rules 150. In some examples, when the incoming packet 135 does not match one of the active rules 150, the controller 110 may receive the unmatched packet event 134 that requests the matching rule 124 to be obtained from the rule storage 120.

From operation 410, the process 400 may move to operation 420 ("DETERMINE NUMBER OF ACTIVE RULE REPLACEMENTS FOR THE ROUTING DEVICE") where a number of active rule replacements for the routing device 140 may be determined. As discussed above, the rolling time counters 331 may be used to count a number of rule replacements made or a number of requests to replace an active rule. In some examples, the rolling time counters 331 is configured to maintain a count for a specified period of time (e.g., a time to replace the active rules 150 in the routing device 140).

From operation 420, the process 400 may move to decision operation 430 ("EXCEED THRESHOLD?") where a determination is made as to whether the number of active rule replacements exceeds the specified threshold. As discussed above, the specified threshold might be based on the available memory space (e.g., the storage capacity) of the routing device 140, a processing capability of the routing device 140, and the like. In response to determining that the threshold is exceeded, the process 400 may move to operation 450. In response to determining that the threshold is not exceeded, the process 400 may move to operation 440.

At operation 440 ("DETERMINE CAPABILITY OF ROUTING DEVICE TO PROCESS REQUEST") a determination may be made as to whether the routing device 140 is capable of processing the current request. As discussed above, the controller 110, or some other computing device, may be configured to determine whether the routing device 140 is currently capable of processing a routing request. For example, a determination may be made as to whether the routing device 140 will drop the incoming packet 130, forward the incoming packet 130 to an incorrect destination, or broadcast the incoming packet 130 in an attempt to deliver the incoming packet 130 to the correct destination.

At operation 450 ("DENY REQUEST TO REPLACE THE ONE OR MORE ACTIVE RULES") the request to replace the one or more active rules may be denied. As discussed above, the rule manager 115 may be configured to deny the request. In some examples, the rule manager 115 may deny the request for a period of time (e.g., a specified period of time and/or when the routing device 140 is capable of processing the request).

From operation 440, the process 400 may move to decision operation 460 ("ROUTING DEVICE CAPABLE?") where a determination is made as to whether the routing device 140 is capable. In response to determining that the routing device 140 is not capable, the process 400 may move to operation 470. In response to determining that the routing device 140 is capable, the process 400 may move to operation 480.

At operation 470 ("DELAY/DENY REQUEST"), the request may be delayed or denied. As discussed above, the rule manager 115 in the controller 110 might delay the request for a specified period of time or might deny the request.

At operation 480 ("ALLOW REQUEST TO REPLACE THE ONE OR MORE ACTIVE RULES") the request may be performed. As discussed above, one or more of the active rules 150 may be replaced with one or more of the stored rules 122. The process 400 might then proceed to an end operation (not shown).

Figure 5:
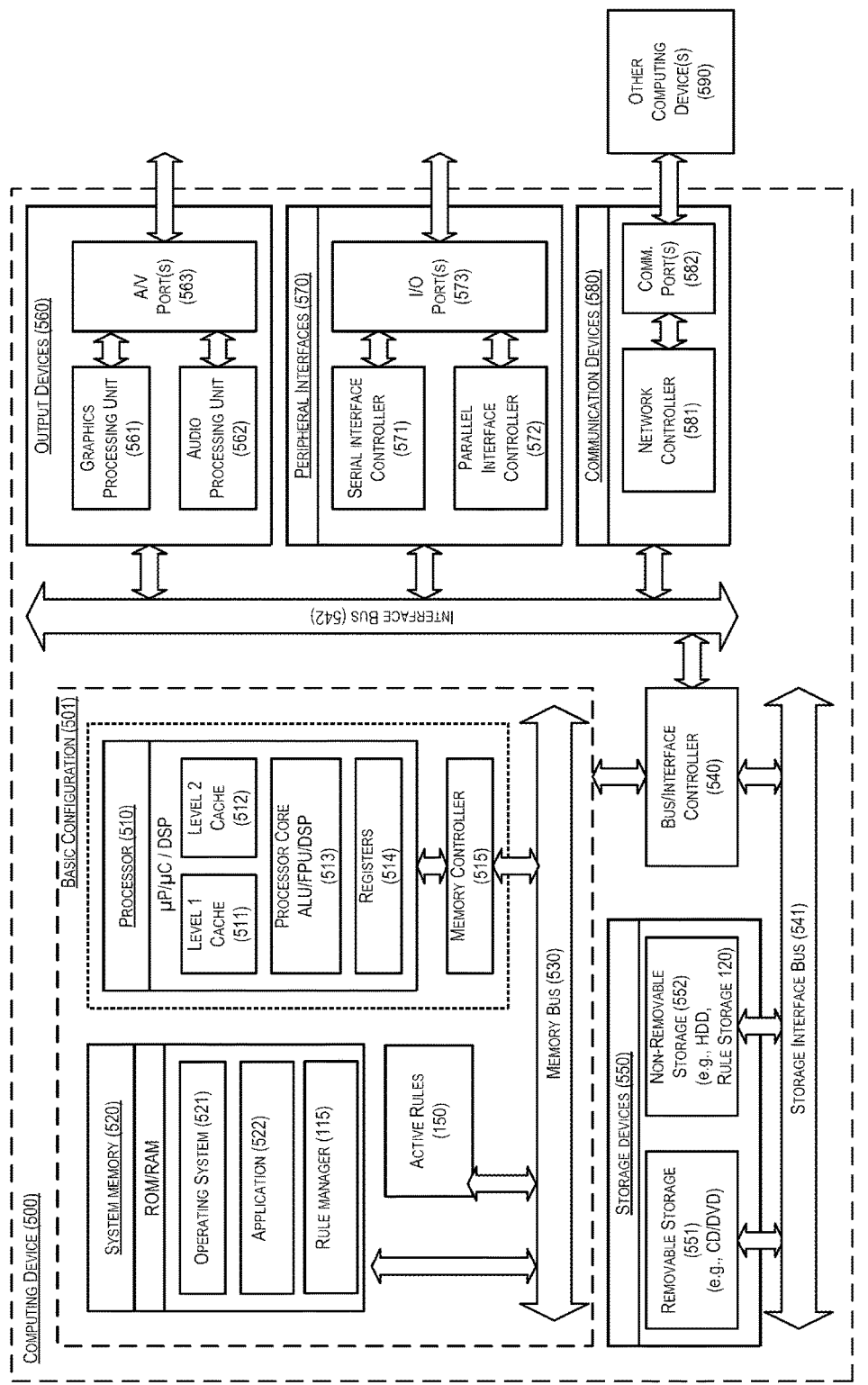
FIG. 5 is a block diagram illustrating an example computing device that is arranged to implement technologies to manage replacement of routing rules, all arranged in accordance with at least some embodiments presented herein.

FIG. 5 is a block diagram illustrating an example computing device 500 that is arranged to implement technologies to manage replacement of routing rules, in accordance with at least some embodiments described herein. The computing device 500 may be implemented as a conventional computer system, an embedded control computer, a laptop, or a server computer, a mobile device, a set-top box, a kiosk, a vehicular information system, a mobile telephone, a customized machine, or other hardware platform. The processor 510 may be configured to implement the logic described above.

In a very basic configuration 501, computing device 500 typically includes one or more processors 510 and system memory 520. A memory bus 530 can be used for communicating between the processor 510 and the system memory 520.

Depending on the desired configuration, processor 510 can be of any type including, but not limited to, a microprocessor ("µP"), a microcontroller ("µC"), a digital signal processor ("DSP"), or any combination thereof. Processor 510 can include one or more levels of caching, such as a level one cache 511 and a level two cache 512, a processor core 513, and registers 514. The processor core 513 can include an arithmetic logic unit ("ALU"), a floating point unit ("FPU"), a digital signal processing core ("DSP core"), or any combination thereof. A memory controller 515 can also be used with the processor 510, or in some implementations, the memory controller 515 can be an internal part of the processor 510. The processor 510 can be a multi-core processor having two or more independent processing units ("cores").

Depending on the desired configuration, the system memory 520 can be of any type including, but not limited to, volatile memory (such as RAM), nonvolatile memory (such as ROM, flash memory, etc.) or any combination thereof. One or more components of the system memory 520 may be comprised of multilevel cells formed from GST material, providing a phase change memory. System memory 520 typically includes an operating system 521 and one or more applications 522. The system memory 520 might also include the rule manager 115, as well as other components, as described above. The memory bus 530 might also be coupled to the active rules 150 that are stored in a memory of the computing device 500.

Computing device 500 can have additional features or functionality, and additional interfaces to facilitate communications between the basic configuration 501 and any required devices and interfaces. For example, a bus/interface controller 540 can be used to facilitate communications between the basic configuration 501 and one or more data storage devices 550 via a storage interface bus 541. The data storage devices 550 can be removable storage devices 551, non-removable storage devices 552, or a combination thereof Examples of removable storage and non-removable storage devices include magnetic disk devices such as flexible disk drives and hard-disk drives ("HDD"s), optical disk drives such as compact disk ("CD") drives or digital versatile disk ("DVD") drives, solid state drives ("SSD"s), and tape drives to name a few. Example computer storage media can include volatile and nonvolatile, removable and non-removable media implemented in any method or technology for storage of information, such as computer readable instructions, data structures, program modules, or other data.

System memory 520, removable storage devices 551 and non-removable storage devices 552 are all examples of computer storage media. Computer storage media includes, but is not limited to, RAM, ROM, EEPROM, flash memory or other memory technology, CD-ROM, digital versatile disks ("DVD"s) or other optical storage, magnetic cassettes, magnetic tape, magnetic disk storage or other magnetic storage devices, or any other medium which can be used to store the desired information and which can be accessed by computing device 500. Any such computer storage media can be part of the computing device 500.

Computing device 500 can also include an interface bus 542 for facilitating communication from various interface devices (e.g., output interfaces, peripheral interfaces, and communication interfaces) to the basic configuration 501 via the bus/interface controller 540. Example output devices 560 include a graphics processing unit 561 and an audio processing unit 562, which can be configured to communicate to various external devices such as a display or speakers via one or more A/V ports 563. The example peripheral interfaces 570 include a serial interface controller 571 or a parallel interface controller 572, which can be configured to communicate with external devices such as input devices (e.g., keyboard, mouse, pen, voice input device, touch input device, etc.) or other peripheral devices (e.g., printer, scanner, etc.) via one or more I/O ports 573. An example communication device 580 includes a network controller 581, which can be arranged to facilitate communications with one or more other computing devices 590 over a network communication via one or more communication ports 582. The communication connection is one example of a communication media.

Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, communication media can include wired media such as a wired network or direct-wired connection, and wireless media such as acoustic, radio frequency ("RF"), infrared ("IR"), Fiber Optics, and other wireless media. The term computer readable media as used herein can include both storage media and communication media.

Computing device 500 can be implemented as a portion of a small-form factor portable (or "mobile") electronic device such as a cell phone, a personal data assistant ("PDA"), a personal media player device, a wireless web-watch device, a personal headset device, an application specific device, or a hybrid device that include any of the above functions. Computing device 500 can also be implemented as a personal computer including both laptop computer and non-laptop computer configurations.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multi-core processor systems, microprocessor-based or programmable consumer electronics, minicomputers, mainframe computers, and the like.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the Detailed Description, claims, or Figures, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 elements refers to groups having 1, 2 or 3 elements. Similarly, a group having 1-5 elements refers to groups having 1, 2, 3, 4, or 5 elements, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is a claimed is:

1. A method to manage replacement of routing rules that are usable by a network device, the method comprising:
   determining a number of active rule replacements for the network device within a time window, wherein the network device is configured to route packets within a network according to active rules stored within a memory of the network device;
   determining that the number of active rule replacements within the time window exceeds a threshold;
   dithering the window on a pseudorandom basis; and
   denying a request to replace one or more of the active rules stored within the memory of the network device for a period of time until the network device is determined to be capable to process the request to replace the one or more of the active rules.

2. The method of claim 1, further comprising storing data related to a payment-based service level for the network device, wherein the threshold is based at least on the payment-based service level for the network device.

3. A method to manage replacement of routing rules that are usable by a network device, the method comprising:
   determining a number of active rule replacements for the network device within a time window, wherein the network device is configured to route packets within a network according to active rules stored within a memory of the network device;
   determining that the number of active rule replacements within the time window exceeds a threshold;
   denying a request to replace one or more of the active rules stored within the memory of the network device for a period of time until the network device is determined to be capable to process the request to replace the one or more of the active rules;
   storing data related to a payment-based service level for the network device, wherein the threshold is based at least on the payment-based service level for the network device; and
   determining whether to confirm, deny, or delay replacement of the one or more of the active rules in response to the request based at least on the threshold, the time window, and the payment-based service level for the network device.

4. The method of claim 3, further comprising dithering the time window.

5. The method of claim 3, further comprising adjusting a duration of the time window based on a performance of the network device.

6. The method of claim 3, further comprising adjusting a duration of the time window based on a network condition.

7. The method of claim 6, wherein the network condition includes a type of network traffic.

8. A method to manage replacement of routing rules that are usable by a network device, the method comprising:
   determining a number of active rule replacements for the network device within a time window, wherein the network device is configured to route packets within a network according to active rules stored within a memory of the network device;
   determining that the number of active rule replacements within the time window exceeds a threshold;
   denying a request to replace one or more of the active rules stored within the memory of the network device for a period of time until the network device is determined to be capable to process the request to replace the one or more of the active rules;

counting a respective number of active rule replacements within the time window for each of a plurality of users of the network device; and in response to a determination that the number of active rule replacements within the time window exceeds the threshold for a user of the plurality of users, denying a request to replace the one or more of the active rules stored within the memory of the network device for that user for at least a period of time, wherein the threshold includes a maximum number of active rule replacements by the user within the time window.

9. The method of claim 8, wherein the maximum number of active rule replacements by the user within the time window is relative to a number of active rule replacements by the plurality of users within the time window.

10. A method to manage replacement of routing rules usable by a network device, the method comprising:

determining a number of active rule replacements for the network device within a time window, wherein the network device is configured to route packets within a network according to active rules stored within a memory of the network device;

determining that the number of active rule replacements within the time window exceeds a threshold;

denying a request to replace one or more of the active rules stored within the memory of the network device for a period of time until the network device is determined to be capable to process the request to replace the one or more of the active rules;

counting the number of active rule replacements for the network device within the time window for a plurality of users of the network device; and in response to a determination that the number of active rule replacements within the time window exceeds the threshold, denying a request to replace the one or more of the active rules stored within the memory of the network device for at least a period of time, wherein the threshold includes a maximum number of active rule replacements by all users of the plurality of users within the time window relative to a number of the active rules.

11. A system, comprising:

a network device configured to route packets within a network based at least, in part, on active rules stored within a memory of the network device;

a monitor device coupled to the network device, wherein the monitor device is configured to:

determine a number of active rule replacements for the network device within a time window;

determine that the number of active rule replacements within the time window exceeds a threshold; and deny a request to replace one or more of the active rules stored within the memory of the network device for a period of time until the network device is determined to be capable to process the request to replace the one or more of the active rules;

a ditherer configured to adjust the time window;

a quality of service (QoS) purchase data storage configured to store data of payment-based service levels for respective users of the network device; and a command changer, coupled to the ditherer, the QoS purchase data storage, and a plurality of counters, wherein the command changer is configured to:

change a rule update command based at least on a current time window, a service level for a current user, and a value of a counter associated with the current user.

12. The system of claim 11, wherein the monitor device comprises the plurality of counters, wherein the plurality of counters are associated with the respective users of the network device, and wherein each counter of the plurality of counters is configured to count a number of active rule replacements within a time window associated with a respective user of the network device.

13. A non-transitory computer-readable medium that includes computer-executable instructions which, in response to execution by a computing device, cause the computing device to perform or control performance of operations comprising:

identify a request to replace one or more active rules in a network device with one or more stored rules, wherein each of the one or more active rules and each of the one or more stored rules provide a routing rule that specifies how to route packets within a network, and wherein the one or more stored rules are not actively being used by the network device to route the packets;

determine a number of active rule replacements for the network device within a time window;

dither the time window;

determine that the number of the active rule replacements exceeds a threshold; and deny the request to replace the one or more active rules in the network device for a period of time until the network device is determined to be capable to process the request to replace the one or more active rules.

14. The non-transitory computer-readable medium of claim 13, wherein the operations comprise at least one operation to:

store data related to a payment-based service level for the network device, wherein the threshold is based at least on the payment-based service level for the network device.

15. The non-transitory computer-readable medium of claim 14, wherein the operations comprise at least one operation to:

determine whether to confirm, deny, or delay replacement of the one or more active rules in response to the request based at least on the threshold, the time window, and the payment-based service level for the network device.

16. The non-transitory computer-readable medium of claim 13, wherein the operations to dither the time window include at least one operation to dither the time window on a pseudorandom basis.

* * * * *